Oct. 24, 1933.  M. B. BURNS  1,931,890
PHOTOGRAPHIC CAMERA
Filed Sept. 12, 1929  2 Sheets-Sheet 2
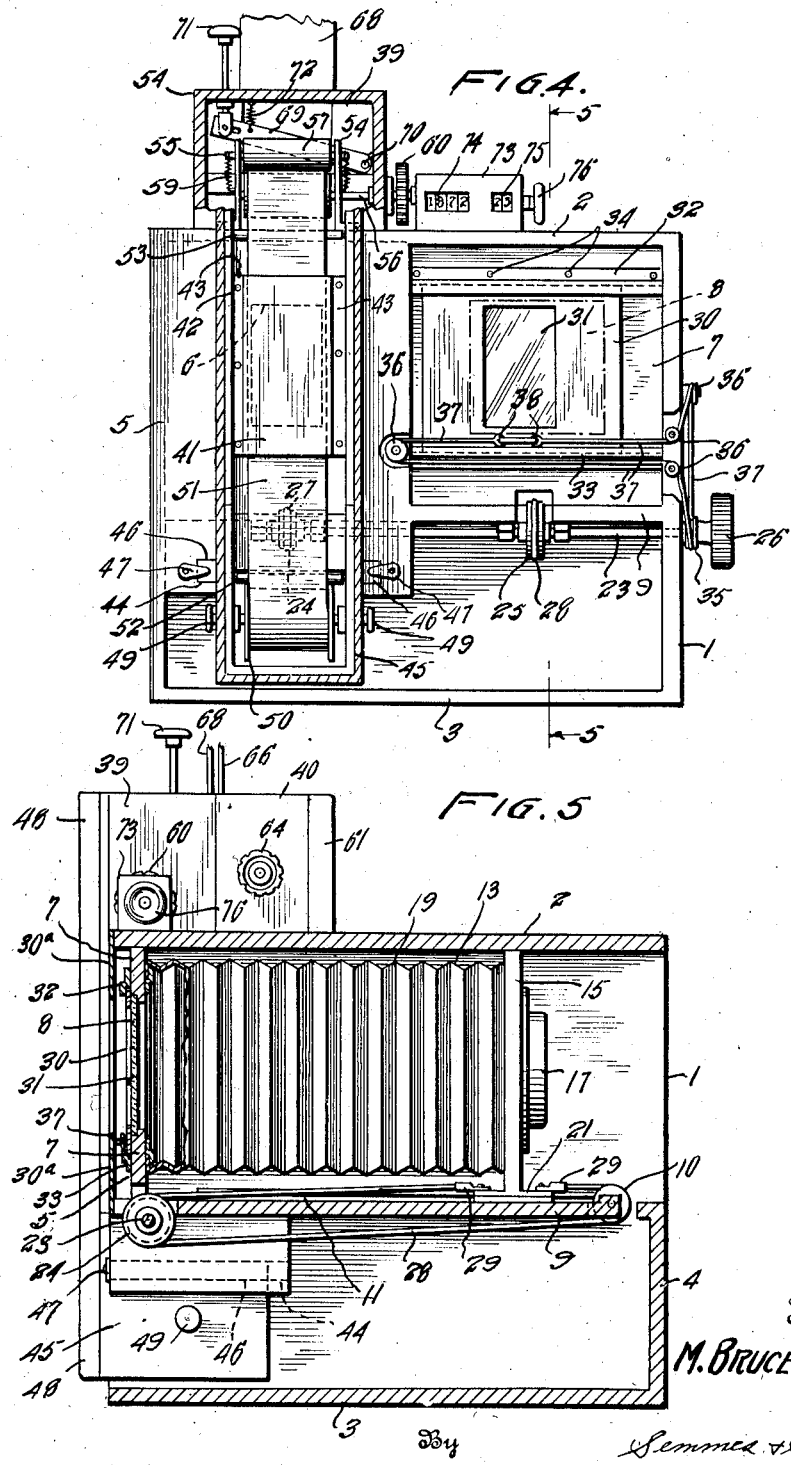
Inventor
M. BRUCE BURNS
By
Semmes & Semmes
Attorney Patented Oct. 24, 1933

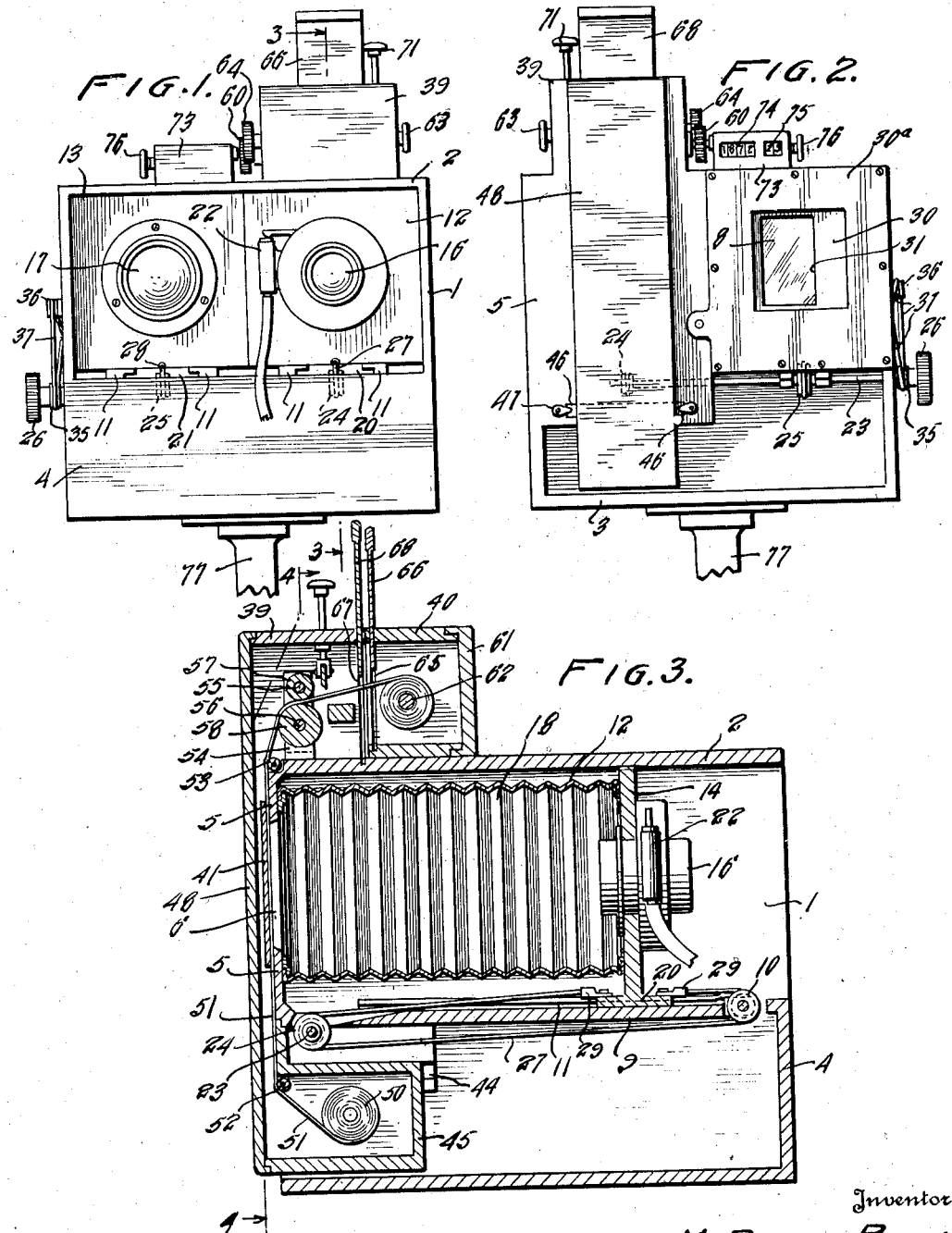

1,931,890

UNITED STATES PATENT OFFICE 1,931,890

PHOTOGRAPHIC CAMERA

Milfred Bruce Burns, Lewiston, Idaho; Sarah L. Burns, administratrix of estate of said Milfred Bruce Burns, deceased, assignor of one-half to Peter Tettelbach, Rochester, N. Y.

Application September 12, 1929
Serial No. 392,159

12 Claims. (Cl. 95—44)

The invention relates to photographic camera and more particularly has reference to a photographic camera employing an auxiliary camera in combination therewith.

This application is a continuation, in part, of my application Serial No. 306,559 filed September 17, 1928 relating to Improvements in cameras.

Portrait cameras, now in general use, employ a sensitized plate in place of a roll film. Such cameras are provided with a ground glass plate, adapted to present the image of the photographic subject to the photographer, in place of a view finder. This plate may be inserted in the rear portion of the camera before taking the photograph.

In the operation of a camera of this type, light is allowed to enter the lens by opening the camera shutter. The rear portion of the camera which is provided with slides, has a removable ground glass plate inserted therein. The camera is then sharply focused upon the photographic subject, the shutter closed, the ground glass plate removed from the camera, and a sensitized film plate put in its place. After these operations, the camera is ready to take the picture and the film is exposed by snapping the shutter. It should be noted that there is a considerable time interval between forcusing the camera and taking the picture.

Such cameras are used principally for photographing human subjects who must be posed after focusing the camera, and who must hold this pose until the exposure is completed. It is well known that the average person is very difficult to pose so that he will appear with a natural expression and will be at ease. It is even more difficult for him to maintain such a pose for a short time period. Because of this weakness of human nature, very few photographs showing the subject in a natural life like posture are obtained. Particularly is this true in the case of children who are as a rule "camera shy" and who only for the briefest instant appear at ease. Consequently, it has long been desired to provide a portrait camera adapted to have the image of the photographic subject constantly before the eye of the photographer so that the minute the subject is posed and at ease, the photograph may be made.

I am aware that in the past, cameras employing a sensitized plate have been provided with a view finder. The principal type of such camera consists in the use of a view finder camera in combination with a photographic camera, and both cameras being pivotally mounted, at their rear portions, upon a base board. In this type, the lens of both cameras have the same focal characteristics, and the two cameras are separated from each other by a short distance.

In photographing a subject, the center of the base board is located in line with the center of the subject and upon focusing the apparatus, both cameras are rotated so as to be angularly disposed with respect to one another. If the base board is accurately centered upon the object, the angle formed by the undeviated light ray of the photographic camera lens and the light ray to the center of the base board will equal the angle formed by the undeviated light ray through the view finder lens and the light ray in the center of the board. Consequently, it may be seen that to obtain substantially the same image in the view finder camera as will appear upon the photographic film, it is necessary that the subject be lined up very accurately with the center of the base board upon which both cameras are mounted. This may be seen to be a serious defect of such construction.

Another disadvantage of this kind of photographic apparatus arises from its multiplicity of parts. Moreover, each part requires, in its formation, a considerable amount of skilled and accurate labor with the attendant small tolerance limit. Should any one of the parts of such apparatus be inaccurately formed, it would be sufficient to cause the entire focusing means to be thrown out of adjustment.

I am aware that roll film cameras having a counting device operated by means of a measuring roller over which the film passes have been employed. The measuring roller is adapted to wind the exposed film upon a receiving spindle and its diameter is such that a specified number of revolutions will exactly move the film a distance equal to the length of the photograph taken by the camera. Geared to this roller is a counting device. However, such counting devices only total the number of exposures equal to the number of pictures which may be taken upon one film roll. Hence it may be seen that a serious defect lies in such a counter in that the total number of pictures taken by the camera, in addition to the number of pictures taken upon a film roll in the camera, does not appear.

The advantage of having a camera using a roll film wherein the exposed portion of the film may be removed from the camera and developed while the remaining portion of the film may be continued to be used in the camera, has long been known to the art. However, due to the fact that there is considerable danger that both the exposed and the unexposed portion of the film may be subjected to light, this has not been previously accomplished. The exception to the above lies in the camera using a sensitized film plate. As it has been pointed out the principal disadvantage of this type of camera lies in the fact that it has no view finder.

An important object of the invention is the provision of a photographic apparatus having a photographic camera and a view-finder camera which may be focused simultaneously.

Another object of the invention is the construction of a photographic apparatus having a photographic camera and a view finder camera, the view finder being provided with a slidably or a shifting image screen, and simultaneous focusing means for both cameras cooperating with means for shifting the image screen.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

The present invention relates to a photographic apparatus having a means for keeping the image of the photographic subject always before the eye of the photographer. One method of practically effecting the concept of this invention is to provide a photographic camera mounted adjacently to a view finder camera, the view finder camera being provided with a slidable image screen.

In order to make my invention more clearly understood, I have shown, in the accompanying drawings, means for carrying the same into practical effect without limiting the improvements in their useful applications to the particular constructions which, for the purpose of explanation, have been made the subject of illustration.

In the drawings:

Figure 1 represents a front view of the photographic apparatus embodied in my invention.

Figure 2 is a rear view of the photographic apparatus embodied in my invention.

Figure 3 is a cross sectional view taken along the line 3—3 of Figure 1 and showing a side elevation of the photographic camera.

Figure 4 is a partial sectional view taken along the line 4—4 of Figure 3 and showing the rear of the photographic apparatus.

Figure 5 is a partial cross sectional view taken along the line 5—5 of Figure 4 and showing a side elevation of the view finder camera used in my invention.

In the accompanying drawings, similar reference numerals refer to similar parts throughout the several views.

The numeral 1 generally designates a housing having a top 2, a bottom 3, a partially closed front portion 4 and a partially closed rear portion 5. Provided in the rear portion 5 is the usual rectangular opening 6 employed in the photographic cameras for allowing light rays to strike a photographic film held before the opening. A plate member 7, positioned within the housing 1 adjacent to the right side and near the rear edge thereof, is provided with a similar opening 8.

Mounted in the housing is a base portion or base member 9 which is equal to the width thereof, and substantially equal to the length. Positioned upon the front end of the base member 9 are a plurality of guide pulleys 10, the purpose of which will hereinafter appear. Provided upon the base member 9 are a plurality of guideways 11, which extend longitudinally of the housing.

Adapted to be slidably mounted within the housing, is a photographic camera generally designated as 12 and a view finder camera generally designated as 13. The cameras are so mounted that their principal axes are parallel and in the same horizontal plane. Cameras 12 and 13 have the usual carriage members 14 and 15 provided to support the lenses 16 and 17. Each camera is provided with conventional bellows 18 and 19.

The front ends of each bellows are secured to their corresponding carriage member while the rear end of the bellows 12 is secured to the rear portion 5 of the housing 1 and the rear end of the bellows 13 is fastened to plate member 7. Both bellows are secured to the carriage members and to the rear portion 5 and the plate member 8 in any convenient manner. Each carriage member is provided with a foot 20 and 21 adapted to engage the guide ways 11 and to be freely slidable therein.

The photographic camera 12 is provided with a shutter, not shown, and any conventional actuating mechanism therefor as at 22. It should be noted that the view finder camera has no shutter for its lens.

Because the foot portion of each lens carriage member is mounted in a separate set of guideways, it may be seen that both cameras may be moved independently of each other, thereby allowing each lens to be separately focused.

Mounted transversely within the housing 1 as seen in Figures 2, 3 and 4 is a rotatable shaft 23 having secured thereto a plurality of pulleys 24 and 25 of unequal diameters. Upon the exterior end of the shaft 23 is an operating handle or knob 26.

As seen in Figure 3 and Figure 4, a cable 27 and a cable 28 passes around the pulley 24 and the pulley 25 respectively. Each cable also passes over one of the guide pulleys 10 located upon the forward end of the base element 9. The ends of the cable 27 are secured to the foot of the carriage member 14 in any conventional manner as shown at 29. Similarly, cable 28 is secured to the carriage member 15 of the view finder camera.

When making an exposure with the photographic apparatus, the photographic camera is sighted upon the photographic subject. Since the view finder camera is mounted so that its principal axis is parallel to the principal axis of the photographic camera, the distance from the object to the lens center of the photographic camera will be less than the distance between the object and the lens center of the view finder camera. For this reason, the focusing pulleys 24 and 25 are of unequal diameters.

In case lenses of like focal characteristics are used in both cameras, the focusing pulley 25 should be of such size that upon rotating the pulleys 24 and 25 through equal angles of rotation, the lens center of the view finder camera will be at the same distance from the object as the lens center of the photographic camera. Hence it may be seen that the diameter of the pulley 25 is directly proportional to the diameter of the pulley 24. Should lenses possessing different focal characteristics be employed in the two cameras, a similar relation between the diameters of the focusing pulleys 24 and 25 would still exist.

In focusing the cameras, the rotation of the actuator handle 26 in a clockwise direction will cause the lenses of both cameras to be moved outwardly so as to be focused upon a nearby object. Upon rotating the operating knob 26 in the opposite or counter-clockwise direction, the lenses will be moved inwardly or towards the back portion of the camera so as to be focused upon a more distant object. Since the lenses of both cameras are moved by means connected with pulleys mounted upon the same shaft, both camera lenses will be moved simultaneously. Moreover, the diameters of the focusing pulleys 24 and 25 allow for synchronized focusing of the two lenses.

As it has been pointed out, the plate 7 is provided with a rectangular opening 8. The opening 8 is considerably larger than the photograph taken by the photographic camera 12, the size of the latter being shown by the opening 6 in the rear cover portion 5. Positioned before the opening 8 is a carriage member 30 having an image screen 31 mounted thereon. Screen 31 is of a size exactly equal to that of the photograph taken by the photographic camera 12. Positioned above and below the opening 8 are guideways 32 and 33 adapted to receive the carriage 30 and to allow it to freely slide therein. These guideways are secured to the rear portion of the view finder camera by any conventional means, such as screws, rivets, nails, brads, etc., as shown at 34.

Formed upon the shaft 23, exteriorly of the housing 1 and adjacent to the operating knob 26, is a screen shifting pulley 35. Guide rollers 36 mounted upon the back 5 and a side 3 of the housing 1 are provided for a cable 37, which passes around the screen shifting pulley 35. The ends of the cable 37 are fastened to the carriage 30 in any convenient manner as at 38.

Shown in Figure 2 is a plate 30a adapted to form a cover for the carriage 30 and the actuating mechanism thereof. Cover plate 30a may be detachably secured to the housing in any convenient manner as, for example, by screws. It should be noted that the cover plate 30a is provided with an opening substantially equal in size to the opening 8 and positioned in front of it.

Since the view finder camera has its principal axis parallel to that of the photographic camera, it is evident that the undeviated light ray from an object to the view finder camera lens will be angularly disposed with respect to the undeviated light ray passing through the photographic camera lens center. As the object approaches the camera, this angle increases. Hence the major portion of the light entering the view finder camera will be upon its right hand side for nearby objects. Similarly, as the object recedes from the camera, the light will have a tendency to shift towards the left hand side of the view finder lens, as the rays of light coming from the object to both cameras become more nearly parallel.

For the above reason, the rectangular opening 8 is made of considerably greater size than the opening 6 in the rear of the photographic camera and also for this reason the image screen 31 is constructed so that it may change its position with respect to the principal axis of the view finder camera.

In focusing the camera upon nearby objects, the image screen 31 will be shifted towards the right or away from the center of the camera, while for objects at a further distance, the screen will shift towards the center and to the left. Because of the angle formed by the undeviated light rays to the lens of the two cameras, it is desirable that a lens, be used in the view finder camera, which has a greater diameter than the lens in the photographic camera.

It is evident that an operator upon turning the knob 26 will cause the pulley 35 to be rotated, with a consequent movement of the cable 37 which is secured to the carriage member 30. This results in the movement of the screen 31 in a direction depending upon the direction of the rotation of the operating knob 26. Because the screen shifting pulley 35 is upon the same shaft as the focusing pulleys 24 and 25, it is apparent that the screen 31 will be shifted to the desired position for any particular focus simultaneously with the focusing of both cameras.

Positioned upon the top 2 of the housing structure 1 is a superstructure 39 having a removable exposed film magazine 40 attached thereto. The purpose of the superstructure 39 and the removable exposed film magazine 40 will hereinafter appear.

Mounted upon the back portion 5 directly in front of the rectangular opening 6 is a plate 41. Plate 41 may be secured to the back 5 in any conventional manner as by screws 42. Vertical strips 43 are located adjacent to the vertical edges of the plate 42 and extend up the back of the photographic camera to the top of the superstructure 39 while they extend below the plate 41 for a short distance. Strips 43 may be formed integral with plate 41 or if it is desired, they may be separate pieces. If such practice is followed, they may be secured to the back portion 5 in any suitable manner.

As seen in the drawings, the back portion 5 is cut away adjacent to the lower end of the strips 43 and is provided a plurality of channels 44, adjacent to this cut-away portion and near the lower end of the back 5. The numeral 45 represents an unexposed film magazine having horizontal lugs 46 located upon its sides. The lugs 46 are adapted to fit within the channels 44 and to hold the unexposed film magazine 45 in a position below the photographic camera. It should be noted that the tops of the side walls of the unexposed film magazine are flush with the bottoms of the vertical strips 43. Hinged tongues 47 adapted to engage the ends of the lugs 46 are employed for holding the unexposed film magazine in the housing.

The vertical strips 43 which are continuations of the side walls of the unexposed film magazine extend for a small distance beyond the face of the back portion 5 so that a detachable cover member 48 extending from the bottom of the exposed film magazine to the top of the superstructure may be secured upon the camera.

In the sides of the exposed film magazine are a plurality of adjustable stub shafts 49 between which a removable supply spindle 50, having an unexposed film 51 wound thereon, is rotatively mounted. Film 51 passes over a guide roller 52 provided in the interior of the exposed film magazine and thence vertically up the back of the camera and between the plate 41 and the rectangular opening 6. After emerging from the top of the plate 41, the film passes over the guide roller 53 and thence into the superstructure and the exposed film magazine.

When it is desired to remove the unexposed film magazine 45, the cover member 48 is detached from the back of the photographic camera and hinged tongues 47 are positioned in non-engagement with the lugs 46. The unexposed film magazine may then be withdrawn from the camera. Upon pulling the stub shafts outwardly or away from the side walls of the magazines, the spindle 50 is freed and may be removed. In placing a new spindle within the magazine and in positioning the magazine within the housing, the above operations are gone through in reverse order.

A plurality of uprights 54 positioned upon the top 2 of the housing and between the vertical strips 43 have shafts 55 and 56 rotatively mounted thereon. If it is desired, bearings for shafts 55 and 56 may be provided. Respectively secured to the shafts 55 and 56 are friction rollers 57 and 58. These rollers frictionally engage the film and are employed for unwinding it from the unexposed film spindle. Springs 59 detachably secured to the ends of the shafts 55 and 56 and fixedly secured to the upright 54 are employed to increase the frictional resistance between the two rollers.

The circumference of the friction roller 58 is such that upon a specified number of rotations, a length of film equal to the length of the photograph taken will be caused to pass between both rollers. If it is desired, the circumference of the lower roller 58 may be made exactly equal to this length or it may be made equal to any fraction or part thereof.

The shaft 56 of the lower tension roller passes through the superstructure 39 and has an operating wheel 60 mounted thereon exteriorly of the superstructure. By rotating the wheel 60, the film may be moved the desired amount so that an unexposed portion thereof will be positioned in front of the opening 6.

To thread the film between the rollers 57 and 58, the springs 59 are detached from shaft 55. This decreases the frictional resistance between the rollers and allows the film to be readily passed between them. After this operation the springs 59 are again secured to the shaft 55.

As it has been previously pointed out, the exposed film magazine 40 is detachably secured, by any suitable means, to the superstructure 39. The front end 61 of the exposed film magazine 40 is constructed so that it is removable from the magazine. Detachably mounted within the exposed film magazine 40 is a receiving spindle 62 adapted to receive the exposed film 51. Spindle 62 is mounted upon adjustable stub shafts 63 and 64, the latter having a hand grip so that the film may be tightly wound upon the spindle.

A groove 65 adapted to receive a slide 66 is provided in the exposed film magazine at its end nearest the superstructure 39. A similar groove 67 positioned in the end of the superstructure adjacent to the exposed film magazine 40 is adapted to receive a similar slide 68. Slides 66 and 68 provide a closure for the superstructure and for the exposed film magazine. Normally, when the camera is in use, both slides are in an extended position so that the film 51 may pass from the superstructure to the exposed film spindle. In loading the camera, the front portion 61 of the exposed film magazine may be removed and the hand inserted within the opening so as to secure the film 51 to the spindle 62.

A cutting edge 69 having one end thereof pivotally mounted within the superstructure at 70 is employed to sever the film when it is desired to remove a portion of the exposed film, from the camera, so that it may be developed. The opposite end of the cutting edge is connected to a handle or plunger 71 in any suitable manner. A spring 72 connected at one end to the cutting edge and at its other end to the top of the superstructure is employed to normally maintain the knife 69 out of engagement with the film. When it is desired to sever the film strip, the plunger 71 is pushed downwardly which causes the knife edge 69 to cut the film. Upon releasing the plunger, the cutter is drawn upwardly by means of the spring 72.

The operation of the cutter in combination with the removable exposed film magazine is as follows: The cutter is employed to sever the film and after this operation the hand grip 64 is turned so as to tightly wind the portion of the severed film, remaining in the superstructure, upon the spindle 62. Slides 66 and 68 are then displaced downwardly so as to effectively close the open ends of the superstructure and the exposed film magazine. The exposed film magazine may then be removed from the top of the housing and taken into a dark room where the slide 66 may be opened and the exposed film removed.

An empty spindle is then inserted in the exposed film magazine, the magazine placed upon the top of the housing and secured to the superstructure and the slide 68 is moved vertically upwardly so as to provide an opening between the superstructure and the exposed film magazine. A dark cloth is then thrown over the superstructure and the exposed film magazine so as to completely cover them and the removable front cover 61 of the magazine 40 is detached. This allows the operator to insert his hand within the exposed film magazine and the superstructure and to draw the film 51, remaining in the camera, forwardly so that it may be secured to the exposed film spindle. The removable front cover 61 is then placed upon the exposed film magazine.

Although I have shown a design in which the exposed film is wound upon a receiving spindle contained in a removable film magazine, I wish it to be distinctly understood that I do not limit myself to this particular construction. It is obvious that the exposed film spindle may be eliminated. This can be accomplished by providing a cutting table mounted adjacently to the point of tangency of the frictional rollers 57 and 58 and located directly below the knife blade of the cutter. After each exposure has been made and the film strip turned up, the knife blade in this construction would be depressed so as to sever a portion of the film equal in length to the photograph. The first severed strip would rest upon the bottom of the exposed film magazine and as more exposures were taken, these exposed film strips would pile up upon each other.

The numeral 73 represents a counter or totalizer employed with my invention. The counter gives two totals; namely, the total shown at 74 which represents the total number of exposures made by the camera and the total given at 75 which gives the total number of exposures made upon the film in the camera.

The counter 73 is driven directly by the shaft 56 of the lower roller 58. As it has been pointed out, shaft 56 extends through the sides of the superstructures and has an operating wheel 60 connected thereto. Wheel 60 is positioned upon the shaft 56 between the superstructure and the counter 73. The numeral 76 represents a knob employed to adjust the numbers giving the exposure total on any particular film. It is apparent that upon the rotation of the roller 58 a strip of film equal in length to the photograph will be wound upon the exposed film spindle and that rotation of the shaft 56 will cause the counter to register.

As observed in the drawings, the photographic apparatus may be mounted upon any suitable stand or tripod 77.

The steps from loading the apparatus with a film to the making of an exposure are as follows:

The apparatus is set up upon the stand 77, the removable cover 48 is detached from the back of the camera, the slides 66 and 68 are placed in their extended position and the front cover 61 of the exposed film magazine 40 is removed. A supply spindle 50 having an unexposed film wound thereon is then rotatively mounted between the adjustable stub shafts 49 of the unexposed film magazine 45, and a similar but empty spindle is mounted in the exposed film magazine 40. In threading the film up the back of the camera, it is passed over the guide roller 52 between the plate 41 and the rectangular opening 6, over the guide roller 53 and between the friction rollers 57 and 58, the tension springs 59 having first been detached from the shaft 55. After passing between the friction rollers, the film is drawn forwardly and secured to the spindle 62 rotatively mounted within the exposed film magazine. Having secured the film to the empty spindle in the exposed film magazine, the front cover portion 61 is now attached thereto, the springs 59 are fastened to the shaft 55 and cover 48 placed upon the rear of the camera.

In photographic films of the roll type, it is usual to attach them to a paper backing of a greater length than the film. The film and the paper backing are wound upon a spindle so that the top layers of the roll will be formed of the paper backing only. This allows the paper backing strip to be threaded through the parts of the camera without fear of exposing any of the film to the light. Such a film is employed in my invention, the paper backing strip being of sufficient length to secure the end thereof to the spindle 62 without exposing the film.

I will now describe the operations involved in focusing and adjusting my camera. This is done by sighting the photographic camera upon the photographic subject, a portion of the photographic film having been positioned in front of the rectangular opening 6. By turning the operation knob 26, focusing pinions 24 and 25 are actuated to simultaneously focus the camera. It may be determined when both cameras are exactly focused by observing the image appearing upon the screen 31. Having focused both cameras, the photographer now poses the subject, and the instant the subject is posed, the exposure may be made by operating the shutter actuating means 22.

After each exposure, the operating wheel 60 is turned which rotates the friction roller 58 and causes a strip of film equal in length to the photograph to be wound upon the exposed film spindle 62. Upon rotating the wheel 60, the counter or totalizer is actuated giving the total number of exposures made by the camera and the number of exposures made upon the film in the camera.

It may be seen from the foregoing description that I have provided a photographic apparatus having a view finder camera and a photographic camera which may be simultaneously focused. Moreover, I have provided a sliding image screen to be used in connection with a photographic and a view finder camera. Finally it will be seen that a photographic apparatus which is of simple construction and which greatly increases the probabilities of obtaining a true and life like photograph of a human subject has been invented.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A photographic device comprising a photographic camera and a view finder camera, said cameras being so mounted that their principal axes are parallel and in substantially the same horizontal plane, lenses for said cameras, a sliding image screen mounted upon the rear of the view finder camera, and means for simultaneously focusing said cameras and shifting the position of said screen.

2. A photographic apparatus comprising a photographic camera and a view finder camera mounted parallel to each other and in substantially the same horizontal plane so that upon positioning the apparatus for photographing an object the undeviated light ray to the view finder lens will be angularly disposed with respect to the undeviated light ray to the photographic camera lens, an image screen equal in size to the photograph taken by the photographic camera being slidably mounted upon the rear of the view finder, and means for simultaneously focusing said cameras and shifting the position of said screen with respect to the principal axis of the view finder camera.

3. The method of constantly presenting the image of a photographic subject to the eye of a photographer comprising associating a view finder camera with a photographic camera so that their principal axes are parallel and in substantially the same horizontal plane and providing the view finder camera with an image screen capable of being horizontally shifted in a plane perpendicular to the principal axis of its camera and simultaneously with the focusing of said cameras.

4. In a photographic instrument, a photographic camera and a view finding camera, said cameras being slidably mounted within a housing structure, an image screen slidably mounted upon the rear of said view finding camera, a rotatable shaft mounted within the housing, pulleys secured to the shaft and means for simultaneously focusing said cameras and shifting the position of said screen.

5. A photographic apparatus comprising a photographic camera and a view finder camera slidably mounted within a housing structure, the principal axes of said cameras being parallel so that upon positioning the photographic camera to photograph an object, the undeviated light ray to the view finder lens will be angularly disposed with respect to the undeviated light ray passing through the photographic camera lens center, an image screen slidably mounted upon the rear of the view finder camera, said screen being equal in size to the photograph taken by the photographic camera, a rotatable shaft mounted within the housing, a plurality of pulleys of unequal diameter mounted thereon and means for simultaneously focusing the cameras and shifting the position of the screen for different focal lengths.

6. The method of focusing a camera having an exposure lens and a focusing lens with their axes in spaced parallel relation, comprising simultaneously adjusting said lenses longitudinally of their axes, the relative adjustment of said lenses being of such difference as to compensate for the parallactic difference in distance between the object being focused and each of said lenses.

7. The method of focusing a camera having an exposure lens and a focusing lens of different focal lengths with their axes in spaced parallel relation, comprising simultaneously adjusting said lenses longitudinally of their axes, the relative adjustment of said lenses being of such difference as to compensate for the parallactic difference in distance between the object being focused and each of said lenses and for the difference in focal length of said lenses.

8. The method of focusing a camera having an exposure lens and a focusing lens with their axes in spaced parallel relation and a laterally shiftable focusing screen, comprising simultaneously adjusting said lenses longitudinally of their axes, the relative adjustment of said lenses being of such difference as to compensate for the parallactic difference in distance between the object being focused and each of said lenses, and simultaneously shifting said focusing screen laterally to compensate for the adjustment of said focusing lens.

9. In combination a camera, a focusable photographing lens and a focusable finder lens secured thereto, means for causing simultaneously axial movement of the lenses, a view finder arranged in the path of the image rays formed by the finder lens and means actuated by the lens moving means for causing movement of the finder whereby the delineation of the field recorded at the photographing aperture of the camera will substantially conform to the delineation of the field viewed at the finder.

10. In combination, a camera, a photographic lens unit and a finder lens unit secured thereto, means for moving both lens units simultaneously whereby both lenses are maintained at the same focus, a view finding image depicting member arranged in the path of the view finder lens unit relatively movable therewith, and means actuated by the lens unit moving member for effecting movement of the image depicting member whereby the delineation of the image field recorded by the photographing lens unit will be substantially the same as the delineation of the image field as viewed on the image depicting member.

11. In combination a camera having a focusable photographing lens and a focusable finder lens thereon in spaced relation, means for causing simultaneously axial movement of the lenses, a view finder arranged in the path of the image rays formed by the finder lens, and means actuated by the lens moving means for maintaining the delineation of the field viewed at the finder substantially the same as the delineation of the field recorded at the photographic aperture of the camera.

12. In combination a camera having a focusable photographing lens and a focusable finder lens thereon in spaced relation, means for causing simultaneously axial movement of the lenses, a view finder arranged in the path of the image rays formed by the finder lens, and means actuated by the lens moving means for maintaining the delineation of the field viewed at the finder substantially the same as the delineation of the field recorded at the photographic aperture of the camera, said photographing lens being movable for focusing in a non-deviating straight path.

M. BRUCE BURNS.